United States Patent
Gayton et al.

(10) Patent No.: US 10,696,100 B2
(45) Date of Patent: Jun. 30, 2020

(54) TIRE TREAD

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Christophe Gayton, Clermont-Ferrand (FR); Saliou Dieng, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

(*) Notice: Subject to any disclaimer, the term of this patent is extended or adjusted under 35 U.S.C. 154(b) by 252 days.

(21) Appl. No.: 15/572,940

(22) PCT Filed: May 24, 2016

(86) PCT No.: PCT/EP2016/061714
§ 371 (c)(1),
(2) Date: Nov. 9, 2017

(87) PCT Pub. No.: WO2016/189006
PCT Pub. Date: Dec. 1, 2016

(65) Prior Publication Data
US 2018/0178587 A1 Jun. 28, 2018

(30) Foreign Application Priority Data
May 28, 2015 (FR) ...................................... 15 54803

(51) Int. Cl.
*B60C 11/03* (2006.01)

(52) U.S. Cl.
CPC ...... *B60C 11/0323* (2013.01); *B60C 2200/06* (2013.01)

(58) Field of Classification Search
CPC .................................................... B60C 11/0323
See application file for complete search history.

(56) References Cited

U.S. PATENT DOCUMENTS 5,445,691 A * 8/1995 Nakayama ........... B29D 30/542
152/209.17
5,603,366 A 2/1997 Nakayama et al.
(Continued)

FOREIGN PATENT DOCUMENTS

EP 0335694 A2 10/1989
WO 02/38399 A2 5/2002
(Continued)

*Primary Examiner* — Steven D Maki
(74) *Attorney, Agent, or Firm* — Dickinson Wright PLLC; Steven Hurles

(57) ABSTRACT

The tire tread having a tread surface and a total thickness E and at least one main groove which opens when new onto a tread surface. In the vicinity of this main groove, at least one discontinuous secondary groove has a plurality of hidden parts and a plurality of open parts. The open parts are open onto the tread surface when new. The main groove and the discontinuous secondary groove have roughly identical main directions. The mean distance L1, which is a distance measured at the open parts between the mean surface of the main groove and the mean surface of the discontinuous groove, is less than the mean distance L2 measured between the mean surface of the main groove and the mean surface of the discontinuous groove in the regions of the discontinuous groove that do not have open parts.

7 Claims, 2 Drawing Sheets

(56) References Cited

U.S. PATENT DOCUMENTS

2011/0168311 A1    7/2011   Voss et al.
2013/0206292 A1    8/2013   Foucher et al.
2013/0206296 A1    8/2013   Bestgen
2013/0340905 A1   12/2013   Bechon et al.

FOREIGN PATENT DOCUMENTS

WO    2010/030276 A1     3/2010
WO    2011/039194 A1     4/2011
WO    2011/098404 A1     8/2011
WO    2011/135000 A1    11/2011
WO    2012/069603 A1     5/2012

* cited by examiner

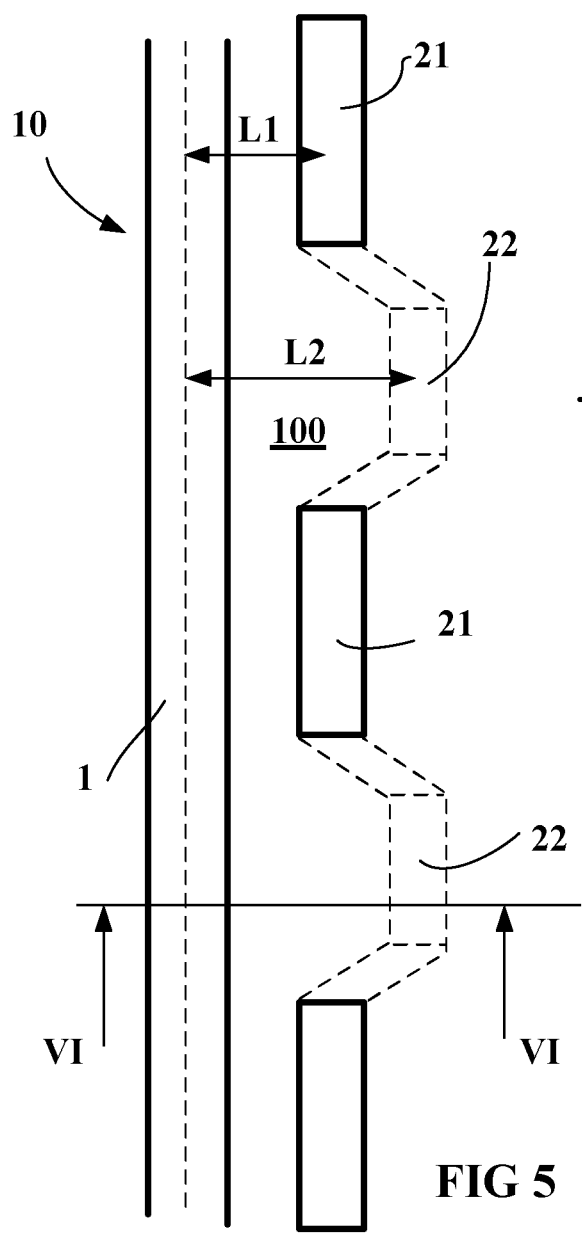
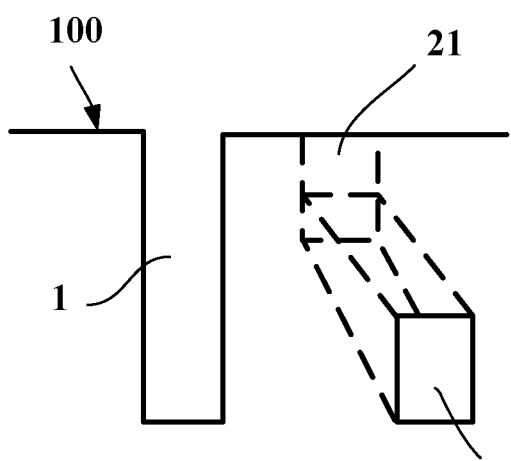
FIG 5
FIG 6

TIRE TREAD

CROSS-REFERENCE TO RELATED APPLICATION

The present application claims priority to PCT International Patent Application Serial No. PCT/EP2016/061714, filed May 24, 2016, entitled "IMPROVED TYRE TREAD," which claims the benefit of FR Patent Application Serial No. 1554803, filed May 28, 2015.

BACKGROUND OF THE INVENTION

1. Field of the Invention

The invention relates to tire treads and more particularly to the tread pattern designs of these treads and to the tires provided with such treads whose performance in terms of the drainage of water present in wet weather on the roadway is rendered more lasting, these treads also having improved performance in terms of wear rate.

2. Related Art

As is known, the use of tires under wet weather driving conditions requires water present in the contact patch in which the tire is in contact with the roadway to be eliminated rapidly so as to ensure contact between the material of which the tread is made and this roadway. Water which is not pushed ahead of the tire flows or is partially collected in the grooves formed in the tread of the tire.

These grooves form a flow network which needs to be lasting, which means to say needs to remain effective throughout the duration of use of a tire between its new state and its removal as a result of wear reaching the limit set by regulations.

For tires intended for the steered or load bearing axles of a heavy goods vehicle, it is common practice to form, in the tread of these tires, circumferential (or longitudinal) grooves the depth of which is equal to the total thickness of the tread (this total thickness not taking into consideration the thickness that may be intended for allowing partial renewal of the grooves through an operation referred to as "regrooving"). Thus, it is possible to obtain a tread having a water drainage performance which is always above a minimal performance referred to as the safe performance, this being true regardless of the degree of wear of this tread.

For tires of the prior art, the total void volume is, as a general rule, at least equal to 10% and at most equal to 25% of the total volume of the tread intended to be worn away during running (the total volume corresponding to the volume of material plus the said total void volume). It is found that these tires have an available void volume in the contact patch which is relatively high in the new state (available void volume meaning that this volume can potentially be partially or completely filled with the water present on the roadway). The void volume opening onto the tread surface in the contact patch is evaluated with the tire subjected to its standard static compression and inflation conditions as notably defined for Europe by the E.T.R.T.O. standard.

If grooves or, more generally, cavities are essential to draining away water in the contact patch in contact with a roadway, the resulting reduction in material on the tread may appreciably affect the performance of this tread as it wears and consequently reduce the duration for which the tire can be used as a result of an increase in the rate of wear of the said tread. Other tire performance aspects may also be affected, notably the handling performance, road noise performance, rolling resistance. It is also found that these grooves, formed so that they have a working depth equal to the wearing tread height, may be the cause of endurance problems. Under certain running conditions, foreign bodies such as stones may be retained in these grooves and damage the bottom of these grooves causing breaks to appear in the rubber.

Creating a plurality of grooves on a tread therefore has the disadvantage of reducing the quantity of tread material for a given width of tread and therefore of reducing the service life of the tire as a result of an excessively high wear rate.

Moreover, the grooves reduce the compression and shear stiffnesses because these grooves delimit portions of material which are sensitive to deformation in comparison with the portions delimited by sipes. Specifically, in the case of a sipe, the walls of material delimiting this sipe can come into contact with one another at least in part in the contact patch in contact with the roadway. This reduction in stiffness, in the case of the presence of grooves, leads to an increase in deformation and generates a reduction in the wearing performance of the tread: more pronounced wear is observed for a set distance covered (which corresponds to an increase in the rate of wear of the tread). Furthermore, an increase in rolling resistance and therefore in fuel consumption of vehicles equipped with such tires is observed as a result of an increase in the hysteresis losses associated with the cycles of deformation of the material of which the tread is made.

In order to limit the drop in stiffness associated with the presence of the grooves required by the need to drain water, a solution described in patent publication WO 2011/039194 has been proposed. This solution proposes a tire tread having a thickness E, this tread being provided with a plurality of grooves that are discontinuous on the tread surface and have an undulating geometry in the thickness of the tread. Each undulating groove is discontinuous at the surface but continuous when new within the tread so as to allow fluid to flow. This undulating groove is formed in the tread by a succession of external cavities opening onto the tread surface when new and a plurality of internal cavities, the latter being positioned radially and completely inside the tread surface when new between the external cavities. The internal cavities may be designed to lie at different depths within the tread.

Furthermore, the continuity of the flow of water within each undulating groove when new is ensured by the presence of connecting cavities, each connecting cavity connecting an external cavity to an internal cavity. Each connecting cavity has two ends, one of these ends being connected to an internal cavity on the one hand and the other end being connected to an external cavity on the other. Each connecting cavity has cross sections (in a plane of section perpendicular to the mean direction of the groove) the cross-sectional areas of which are different from zero and equal respectively to the cross-sectional areas of the internal and external cavities connected by this connecting cavity.

By virtue of the presence of these connecting cavities, it is possible to ensure circulation of water from an external cavity towards an internal cavity and thus to obtain better drainage of the water by reducing hydrodynamic pressure head losses.

In addition, by virtue of this tread structure, there is obtained a void volume that is suitable and reduced by comparison with that of the usual grooves while at the same time achieving satisfactory drainage when new. This type of groove makes it possible to limit the reduction in stiffness of the tread when new, this reduction being connected with the presence of cavities or voids in the tread.

In the present document, the terminology "undulating cavity" or "undulating groove" in the depth of a tread denotes any cavity or groove having a geometry that is variable in the depth of the tread and that opens discontinuously onto the tread surface either when new or following partial wear. This undulating groove once open at least in part onto a tread surface via external parts forms a groove that allows liquid to circulate and at the very least allows temporary collection of liquid, the external parts being connected to the internal parts. An undulating groove may extend over more than two successive levels within the thickness of the tread. An undulating groove may follow a roughly longitudinal geometry (which means to say one oriented in the circumferential direction on the tire) or any other direction that is oblique with respect to this longitudinal direction.

This same document WO 2011/039194 describes a tread comprising a first plurality of undulating grooves undulating between a first wearing layer and a second wearing layer in a first direction and a second plurality of undulating grooves undulating in the same wearing layers and directed in a second direction that intersects the first direction to form a network of intersecting grooves. These first and second pluralities of grooves are arranged in such a way that the internal cavities of these first and second pluralities of grooves are interconnected in order to reinforce the network effect.

Documents EP 0335694-A2 and WO 2010/030276 A1 disclose tires the treads of which are provided with grooves that are open onto the tread surface of the tread when new and with sipes comprising enlarged parts forming small cylindrical grooves of radial orientation which are open onto the tread surface when new. These sipes follow a zig-zag line forming points, each point comprising a small cylindrical groove.

In order to optimize the operation of a tread provided with at least one undulating groove in the thickness, provision has been made to form at least one non-undulating groove in the thickness, this groove opening onto the tread surface of the tread right from the as-new state, and over the entire length thereof.

It has been found that combining an undulating groove with a groove that is open onto the tread surface of a tread when new, over its entire length, may lead to uneven wear, namely to wear which is not distributed uniformly across the tread surface. This uneven wear may cause the tire to have to be replaced prematurely.

The prior art has also proposed a discontinuous groove, described notably in document EP 1341679 B1, whereby the parts open onto the tread surface when new are not connected to hidden parts present beneath the tread surface by connecting parts but only by sipes. In this configuration, there is little or no circulation of liquid from an open part towards a hidden part.

It has also been found that the combination of a discontinuous groove of this type with a main groove that is open along its entire length onto the tread surface of a tread when new may lead to uneven wear, namely to wear that is not distributed uniformly over the tread surface.

DEFINITIONS

Equatorial midplane: this is a plane perpendicular to the axis of rotation and passing through the points on the tire that are radially furthest away from the said axis.

A radial direction in this document means a direction which is perpendicular to the axis of rotation of the tire (this direction corresponds to the direction of the thickness of the tread).

A transverse or axial direction means a direction parallel to the axis of rotation of the tire.

A circumferential direction means a direction which is tangential to any circle centred on the axis of rotation. This direction is perpendicular both to the axial direction and to a radial direction.

The total thickness E of a tread is measured, on the equatorial plane of the tire provided with this tread, between the tread surface and the radially outermost part of the crown reinforcement in the new state.

A tread has a maximum thickness of material to be worn away during running, this maximum thickness of material to be worn away being less than the total thickness E.

The usual running conditions for the tire or conditions of use, are those defined by the E.T.R.T.O. standard for running in Europe; these conditions of use specify the reference inflation pressure corresponding to the load bearing capability of the tire as indicated by its load index and speed rating. These conditions of use may also be referred to as "nominal conditions" or "use conditions".

A cut generically denotes either a groove or a sipe and corresponds to the space delimited by walls of material facing one another and distant from one another by a non-zero distance (referred to as the "width of the cut"). What differentiates a sipe from a groove is precisely this distance: in the case of a sipe, this distance is suited to allowing at least partial contact between opposing walls delimiting the said sipe at least when in the contact patch in contact with the roadway. In the case of a groove, the walls of this groove cannot come into contact with one another under the usual running conditions as defined for example by the E.R.T.O.

A groove is said to be continuous when it is open onto the tread surface when new and is so over its entire extent.

A groove is said to be discontinuous when it is formed of a succession of parts open onto the tread surface when new, these parts being disjointed from one another in the main direction of this groove (namely along its extent).

The mean surface of a continuous or discontinuous groove is defined as being a virtual surface dividing this groove, in the main direction of this groove, into two equal or substantially equal parts.

The main direction of a groove corresponds to the direction of a flow of water in the groove when running on a roadway covered with water.

BRIEF DESCRIPTION OF THE INVENTION

The present disclosure seeks to obtain good running performance in wet weather while proposing a tread pattern design that is improved in terms of wear and more particularly that reduces the risks of uneven wear.

To this end, one subject of the disclosure is a tire tread comprising a tread surface intended to come into contact with a roadway, this tread having a total thickness E and comprising:

at least one main groove opening along its entire length when new onto the tread surface of the tread, this groove having a total depth P at most equal to the total thickness E, a mean surface that divides the groove into two equal halves, and, in the vicinity of this main groove, at least one discontinuous secondary groove extending in the thickness of the tread down to a depth equal or close to the depth P of the main groove, this discontinuous secondary groove having a plurality of parts hidden beneath the tread surface when new and a plurality of open parts (21) open onto the tread surface when new, these open parts being disjointed with respect to one another on the tread surface when new, this discontinuous secondary groove (2) having a mean surface that divides the said groove into two equal halves, the main groove and the discontinuous secondary groove having roughly identical main directions.

This tread is such that all the open parts of the discontinuous secondary groove are at a mean distance L1 from the main groove, this distance L1 being measured at the open parts between the mean surface of the main groove and the mean surface of the discontinuous secondary groove, this distance L1 being less than the mean distance L2 measured between the mean surface of the main groove and the mean surface of the discontinuous groove in the regions of the discontinuous secondary groove that do not have open parts.

The hidden parts of the secondary groove that is discontinuous at the surface are intended to form new grooves opening onto the tread surface.

In that way, a uniform variation in the distance between the mean surface of the continuous main groove and that of the discontinuous secondary groove is generated in such a way as to reduce the volume of material situated between this main groove and each open part of the discontinuous secondary groove.

For preference, the difference between the distances L2 and L1 is at least equal to 20% of the mean width of the open parts of the discontinuous secondary groove and, more preferably still, at least equal to 30%.

If the mean distance between the open parts of a discontinuous secondary groove when new is denoted R, and the mean length of each open part of a discontinuous secondary groove is denoted L, then the length L is at least equal to half the distance R.

More preferably still, the length L is equal or close to the distance R.

In one particularly advantageous alternative form, the discontinuous secondary groove is an undulating groove formed of a plurality of parts which are open when new onto the tread surface of the tread and of a plurality of hidden parts, these hidden parts being connected to the open parts by connecting parts to allow a flow of fluid to become established in the discontinuous secondary groove in wet weather, this undulating groove extending in the depth down to a depth equal or close to the depth of the main groove. This type of undulating groove defines several levels of wear each characterized by its own distribution of voids on the tread surface.

Thanks to this advantageous measure, it is possible to obtain better control over the movements of material when moulding the tread between the undulating groove and the main groove and by virtue of that it becomes possible to limit the uneven wear generated by quantities of material not uniformly distributed notably in the thickness direction of the tread.

According to another alternative form of embodiment of the disclosure, the presence of a main groove (1) and of two discontinuous undulating grooves, are combined in a tread, these three grooves having the same main direction, the main groove being formed between the two discontinuous undulating grooves, these two discontinuous undulating grooves being phase-shifted relative to one another so that their parts open onto the tread surface are offset with respect to one another in the main direction of these discontinuous undulating grooves.

Further features and advantages of the disclosure will become apparent from the description given hereinafter with reference to the attached drawings which, by way of non-limiting examples, show some embodiments of the subject matter of the disclosure.

BRIEF DESCRIPTION OF THE FIGURES

FIG. 5 shows a partial surface view of a third alternative form of the disclosure; and FIG. 6 shows a cross section on a plane VI-VI identified by its line in FIG. 5.

DETAILED DESCRIPTION OF THE ENABLING EMBODIMENTS

To make the figures easier to study, identical reference signs are used to describe alternative forms of the disclosure where these reference signs refer to elements of the same either structural or functional nature.

Figure 1:
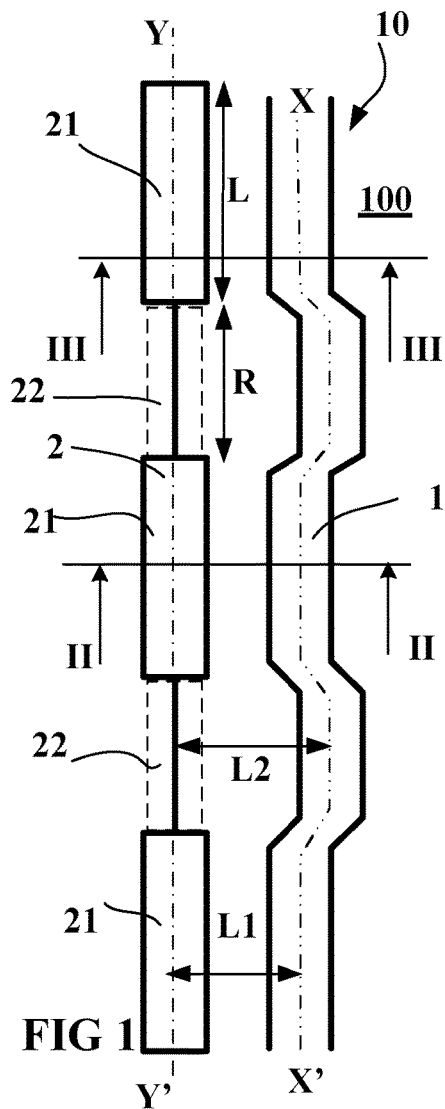
FIG. 1 depicts a surface view of a first alternative form of tread according to the disclosure.

FIG. 1 depicts a partial view of a first alternative form of tread 10 for the tire of a heavy goods vehicle according to the disclosure. The tread has a total thickness E, this thickness being greater than the maximum height of material to be worn away during running before the tire has to be changed.

In this alternative form, a continuous first main groove 1 is open over its entire length onto the tread surface 100 of the tread 10 when new. This first groove 1 has a mean width and a depth P suitable for being present on the tread until the wear limit for this tread is reached. The depth P of this groove is at most equal to the thickness E of the tread 10. Overall, this groove 1 extends in the circumferential direction of the tire.

Figure 2:
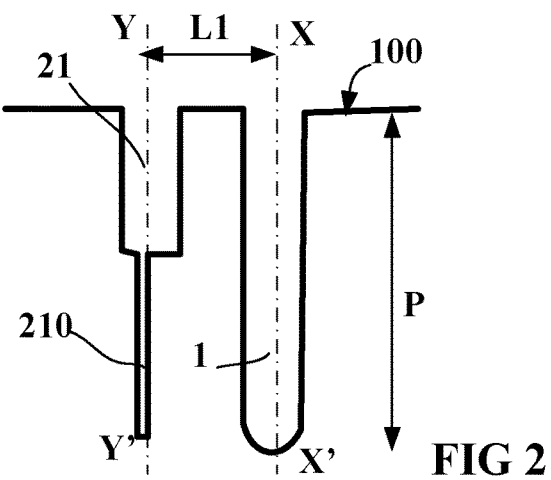
FIG. 2 shows a view in cross section of the tread shown in FIG. 1 on a plane of section the line of which is identified by the line II-II.
Figure 3:
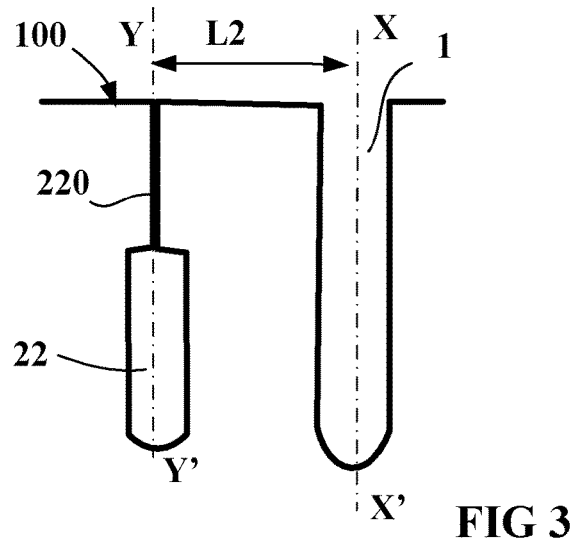
FIG. 3 shows a view in cross section of the tread shown in FIG. 1 on a plane of section the line of which is identified by the line III-III.

Near to this continuous main groove 1 is formed a discontinuous secondary groove 2 that undulates in the thickness of the tread. This discontinuous groove 2 extends into the thickness of the tread down to a maximum depth equal or close to the depth P of the main groove as shown in FIGS. 2 and 3. This discontinuous groove 2 is discontinuous on the tread surface 100 in that it exhibits a plurality of open parts 21 of mean length L separated from one another in the circumferential direction by a distance R. Furthermore, these open parts 21 are connected each one to the next by a plurality of hidden parts 22 formed below the tread surface when new 100.

This discontinuous secondary groove 2 comprises a mean surface that divides the said groove into two equal halves, this mean surface intersecting the plane of FIG. 1 along a line indicated by the reference YY'. Likewise, the continuous main groove 1 comprises a mean surface that divides the said groove into two equal halves, this mean surface intersecting the plane of FIG. 1 along a line indicated by the reference XX'.

The disclosure consists in adapting the geometry of the groove 1 that is open over its entire length in such a way that the distance between the mean surfaces of the open groove and the discontinuous and undulating groove is variable and dependent on the open parts.

The first groove 1 that is open over its entire length onto the tread surface 100 is positioned near the undulating groove 2 in such a way that the mean distance L1, which is the distance measured in line with the open parts 21 between the mean surface XX' of the continuous main groove 1 and the mean surface YY' of the discontinuous groove 2, is less than the mean distance L2 measured between the mean surface XX' of the main groove 1 and the mean surface YY' of the discontinuous groove 2 in the regions of the discontinuous groove 2 that do not have open parts 21.

FIG. 2 depicts a cross section through the tread shown in FIG. 1 on a plane the line of which follows the line II-II in this FIG. 1.

It may be seen that the continuous groove 1 has the same depth as the discontinuous groove 2 of which the part close to the tread surface has been depicted in the form of an open cavity 21, this open cavity 21 being extended inwards by a sipe 210 ending at the same depth as the continuous groove 1. Furthermore, the distance between the mean surfaces XX' and YY' is L1 in this cross section.

FIG. 3 depicts a cross section of the tread shown in FIG. 1 on a plane the line of which follows the line in this FIG. 1.

It may be seen that the discontinuous groove 2 in this cross section comprises a sipe 221 extended by a hidden void 22 which is intended to form a new groove after partial wear. Furthermore, the distance between the mean surfaces is L2 in this cross section; this distance L2 is greater than the distance L1.

The alternative form that has just been described for a tire size 295/80R22.5 has the following features:
L=60 mm
R=60 mm
P=13 mm
Groove width=10 mm
Difference in distances=(L2−L1)=3 mm It is preferable for the difference in distance between the mean surfaces to be at least equal to 20% of the mean width of the grooves.

Figure 4:
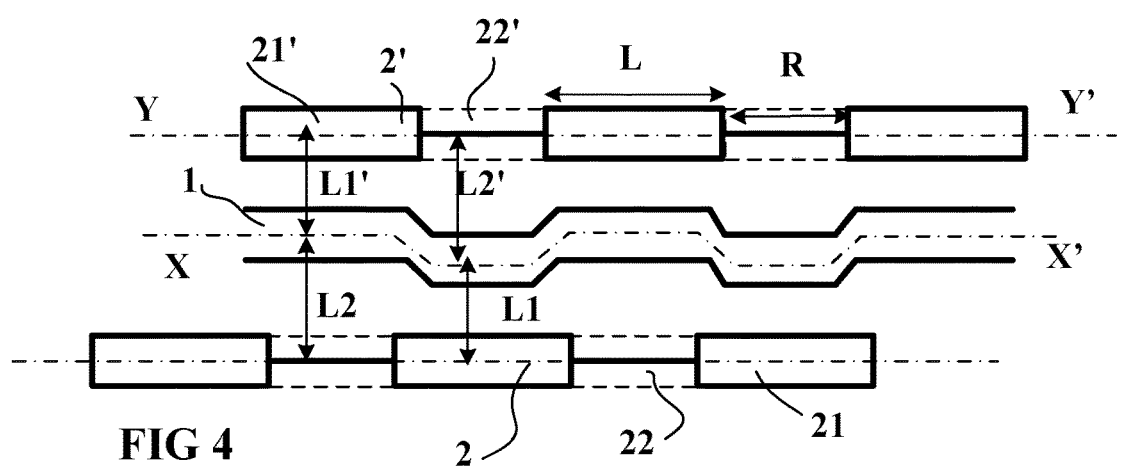
FIG. 4 depicts a surface view of a second alternative form of tread according to the disclosure.

FIG. 4 depicts another embodiment of a tread according to the disclosure. In this embodiment, one continuous groove 1 and two discontinuous undulating grooves 2, 2'. The continuous groove 1 is formed in such a way as to have a geometry that zig-zags over the tread surface when new 100. The discontinuous grooves 2, 2' are positioned in such a way as to respect the rule regarding the distances between the mean surfaces as expressed in the disclosure, namely that the open parts 21, 21', respectively, open onto the tread surface when new, are closer to the continuous groove 1 than the hidden parts 22, 22', respectively, are to the same continuous groove 1. This results in the following relationships: L1<L2 and L1'<L2'.

FIG. 5 shows a third alternative form of embodiment of a tread according to the disclosure. In this alternative form, a continuous groove 1 is rectilinear and is adjacent to a discontinuous groove 2 undulating in the depth of the tread 10. This discontinuous groove 2 comprises open parts 21 opening onto the tread surface 100 and hidden parts 22, these hidden parts being laterally offset with respect to the mean plane of the continuous groove 1. Thus, the volumes of material between the two grooves are reduced at the level of the parts that are open onto the tread surface when new by comparison with the volumes at the level of the hidden parts.

FIG. 6 shows a cross section on a plane the line of which is marked by the line VI-VI in FIG. 5. It may be seen that the distance L1 separating an open part 21 is less than the distance L2 separating the hidden part 22.

The disclosure also relates to a tire provided with a tread as described and more particularly to a tire intended to be fitted to the steered axle of a heavy goods vehicle.

Of course, the disclosure is not restricted to the examples described and depicted and various modifications can be made thereto without departing from the scope as defined by the claims. In particular, that which has been described with reference to a first groove and a second groove could easily be conceived of with more than two grooves formed on each side of a groove that undulates in the thickness of a tread.

The invention claimed is:

1. A tire tread comprising a tread surface intended to come into contact with a roadway, this tread having a total thickness E and comprising:
  at least one main groove opening along its entire length when new onto the tread surface of the tread, this groove having a total depth P at most equal to the total thickness E of the tread, and, in the vicinity of this main groove,
  at least one discontinuous secondary groove extending in the thickness of the tread down to a depth equal or close to the depth P of the main groove, this discontinuous secondary groove having a plurality of parts hidden beneath the tread surface when new and a plurality of open parts open onto the tread surface when new, these open parts being disjointed with respect to one another on the tread surface when new, this discontinuous secondary groove having a mean surface that divides the said groove into two equal halves,
  the main groove and the discontinuous secondary groove having roughly identical main directions, and
  wherein all the open parts of the discontinuous secondary groove are at a mean distance L1 from the main groove, this distance L1 being measured at the open parts between the mean surface of the main groove and the mean surface of the discontinuous secondary groove, this distance L1 is less than the mean distance L2 measured between the mean surface of the main groove and the mean surface of the discontinuous groove in the regions of the discontinuous secondary groove that do not have open parts.

2. A tire tread according to claim 1, wherein the difference between the distances L2 and L1 is at least equal to 20% of the mean width of the open parts of the discontinuous secondary groove.

3. A tire tread according to claim 1 wherein, if the distance between the open parts of a discontinuous secondary groove when new is denoted R, and the mean length of each open part of a discontinuous secondary groove is denoted L, then the length L is at least equal to half the distance R.

4. A tire tread according to claim 1, wherein the length L is approximately the distance R.

5. A tire tread according to claim 1, wherein the discontinuous secondary groove is an undulating groove formed of a plurality of parts which are open when new onto the tread surface of the tread and of a plurality of hidden parts, these hidden parts being connected to the open parts by connecting parts to allow, when new, a flow of fluid to become established in the discontinuous secondary groove in wet weather.

6. A tire tread according to claim 1, wherein the tread combines the presence of a main groove and of two discontinuous secondary grooves, these three grooves having the same main direction, the main groove being formed between the two discontinuous secondary grooves, these two discontinuous secondary grooves being phase-shifted relative to one another so that their parts open onto the tread surface are offset with respect to one another in the main direction of these discontinuous secondary grooves.

7. A heavy goods vehicle tire provided with a tread according to claim 1.

* * * * *